United States Patent
Emmett

(10) Patent No.: US 10,568,354 B2
(45) Date of Patent: Feb. 25, 2020

(54) METHOD OF MAKING TOBACCO PRODUCTS

(71) Applicant: PHILIP MORRIS PRODUCTS S.A., Neuchatel (CH)

(72) Inventor: Robert Emmett, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 62 days.

(21) Appl. No.: 15/738,770

(22) PCT Filed: Jul. 20, 2016

(86) PCT No.: PCT/EP2016/067270
§ 371 (c)(1),
(2) Date: Dec. 21, 2017

(87) PCT Pub. No.: WO2017/013164
PCT Pub. Date: Jan. 26, 2017

(65) Prior Publication Data
US 2018/0177222 A1    Jun. 28, 2018

(30) Foreign Application Priority Data
Jul. 21, 2015 (EP) ..................... 15177775

(51) Int. Cl.
*A24B 3/14* (2006.01)
*B33Y 10/00* (2015.01)
*B33Y 30/00* (2015.01)
*B33Y 70/00* (2020.01)
(Continued)

(52) U.S. Cl.
CPC ............... *A24B 3/14* (2013.01); *A24B 15/14* (2013.01); *B33Y 10/00* (2014.12); *B33Y 30/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS

| | | |
|---|---|---|
| 5,099,864 A | 3/1992 | Young |
| 6,280,785 B1 | 8/2001 | Yang |
| 7,946,296 B2 | 5/2011 | Wrenn |

(Continued)

FOREIGN PATENT DOCUMENTS

| | | |
|---|---|---|
| CN | 102742926 | 10/2012 |
| CN | 103300472 | 1/2016 |

(Continued)

OTHER PUBLICATIONS

CN 103300472A Translation; Guangfeng Luo (Year: 2013).*
(Continued)

*Primary Examiner* — Eric Yaary
(74) *Attorney, Agent, or Firm* — Mueting, Raasch & Gebhardt, P.A.

(57) ABSTRACT

A method of making a three-dimensional tobacco object comprises providing tobacco dust comprising tobacco particles having an average particle size of from about 100 micrometres to about 400 micrometres; preparing an aqueous slurry containing the tobacco dust; supplying the slurry to a print head of an additive manufacturing system; and dispensing the slurry by means of the print head to form successive layers of the tobacco object.

13 Claims, 1 Drawing Sheet

(51) Int. Cl.
  *B33Y 80/00* (2015.01)
  *A24B 15/14* (2006.01)

(56) References Cited

U.S. PATENT DOCUMENTS

2010/0040767 A1* 2/2010 Uibel ................. A61C 13/0004
                                              427/2.27
2010/0170522 A1* 7/2010 Sun ....................... A24B 13/00
                                              131/274
2017/0151713 A1* 6/2017 Steele ................. B29C 67/0055

FOREIGN PATENT DOCUMENTS

EA         14990 B1    6/2009
EP         0565360    10/1993
SU         18929919    5/1975

OTHER PUBLICATIONS

PCT/EP2016/067270 International Search Report and Written Opinion dated Nov. 7, 2016 (3 pages).
European Extended Search Report for Application No. 15177775.2 dated Jan. 20, 2016 (5 pages).
Office Action issued in Russia for Application No. 2017146264 dated Dec. 12, 2019 (11 pages). English translation included.

* cited by examiner

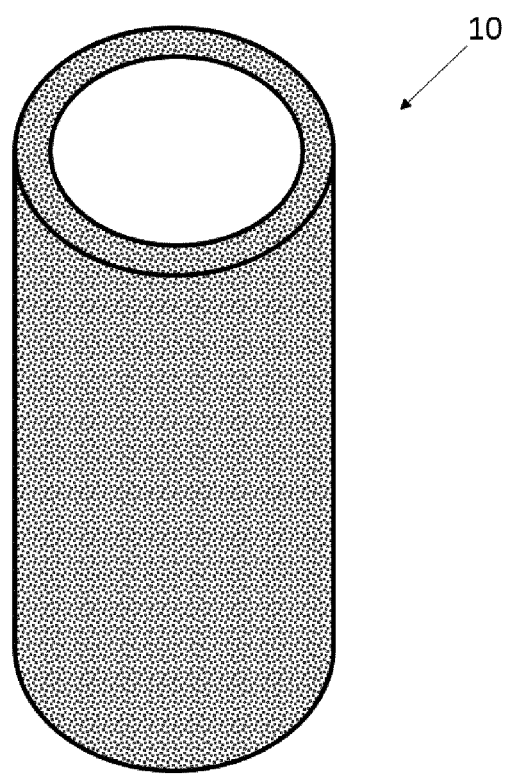

METHOD OF MAKING TOBACCO PRODUCTS

This application is a U.S. National Stage Application of International Application No. PCT/EP2016/067270 filed Jul. 20, 2016, which was published in English on Jan. 26, 2017, as International Publication No. WO 2017/013164 A1. International Application No. PCT/EP2016/067270 claims priority to European Application No. 15177775.2 filed Jul. 21, 2015.

The present invention relates to a method of making a three-dimensional tobacco object for incorporation in a smoking article. In particular, the tobacco objects obtainable by the method may find application as a component of tobacco cut filler, as well as an alternative to conventional reconstituted tobacco.

During normal tobacco processing operations, such as stemming, aging, blending, cutting, drying, cooling and screening of tobacco material, tobacco dust and tobacco particles are produced. Methods are known for recovering tobacco dust and tobacco particles which would otherwise go to waste, so that their useful tobacco content may be reclaimed. By way of example, it is known to recycle tobacco dust and tobacco particles in a cast leaf process for the production of reconstituted tobacco sheets. Reconstituted tobacco sheets obtained by one such process may be cut to produce a tobacco filler material suitable for cigarettes and other smoking articles.

These methods typically require dedicated equipment, often at a different locations and operating independently of the cigarette making facility. Further, these processes generally consume a significant amount of energy. For example, these processes require large scale dryers for the evaporation of the water content of the slurry from which the reconstituted tobacco sheet is cast.

For these reasons, the known methods may be not always be optimised in terms of overall production costs, process efficiency, or logistics. Further, these methods are generally limited in terms of the size and shape of the reconstituted tobacco particles obtainable. In general, it would be desirable to improve the filling power of the product recovered from tobacco dust.

Therefore, it would be desirable to provide a method of making a tobacco object for incorporation in a smoking article by which tobacco dust and particles recovered during normal tobacco processing may be easily integrated into the cigarette making process. Further, it would be desirable to provide a method of making a tobacco object for incorporation in a smoking article that has improved versatility in terms of shape and size of the object obtainable by the method. At the same time, it would be desirable to provide a method of making a tobacco object for incorporation in a smoking article from recovered tobacco dust and particles that may be implemented with improved energetic efficiency. Finally, it would be desirable to provide a tobacco cut filler that has an improved filling power.

According to the present invention, there is provided a method of making a three-dimensional tobacco object, comprising: providing tobacco dust comprising tobacco particles having an average particle size of from about 100 micrometres to about 400 micrometres; preparing an aqueous slurry containing the tobacco dust; supplying the slurry to a print head of an additive manufacturing system; and dispensing the slurry by means of the print head to form successive layers of the tobacco object.

In the present specification, the expression "additive manufacturing system" is used to refer to any of various pieces of equipment that can be used to sequentially deposit material to form a three-dimensional item layer by layer under computer control. This expression is typically used, in particular, to refer to three-dimensional printing, hereinafter referred to as 3D printing, that is the process by which a series of layers of a material are laid down in much the same way as an inkjet printer would lay down ink, whereby multiple passes of a print head will build the item. However, it shall be appreciated that a wider variety of modified additive manufacturing processes is available, including processes based on extrusion and sintering, and the expression "additive manufacturing system" shall be construed as also encompassing such alternative techniques.

In contrast to known methods for recovering tobacco dust and particles generated recovered during normal tobacco processing, according to the present invention fine tobacco particles with an average particle size of from about 100 micrometres to about 400 micrometres are combined with an aqueous medium to form a tobacco slurry. This slurry is supplied to the printing head of a 3D printer and dispensed through a nozzle to form successive layers of an object.

Thus, the tobacco dust and particles recovered during normal tobacco processing are subjected to a simple and inexpensive process that can conveniently be carried out at the same cigarette making facility in a cost-effective manner. This is advantageous from a logistics viewpoint.

Further, by selecting the geometry of the tobacco object formed by the method, and by dispensing a slurry containing tobacco dust particles having predetermined dimensions through a nozzle having a given size, it is possible to tailor the properties of the printed object in view of different potential uses. In particular, for use as a component of tobacco cut filler, the filling power may be significantly improved with respect to that of conventional products formed from recovered tobacco dust.

It will be appreciated that methods according to the invention are very versatile because, by controlling the average size of the tobacco particles and operating parameters such as, for example, the size of the nozzle aperture, the quality of the deposition operation can be optimised and the features of the product obtainable by the method can be finely adjusted and tailored in view of different subsequent uses.

In methods according to the present invention fine tobacco particles with an average particle size of from about 100 micrometres to about 400 micrometres are combined with an aqueous medium to form a tobacco slurry.

Preferably, the tobacco slurry further comprises a humectant, an agent for preserving tobacco and a binder.

Preferably, the tobacco particles comprise at least one of Flue-Cured, Turkish, Maryland, Burley, Virginia or Oriental tobacco. The tobacco particles may originate from tobacco stems and tobacco leaves.

Preferably, the humectant is glycerin or propylene glycol, or any combination of these.

Preferably, the agent for preserving tobacco is at least one of propionates, carbonates, benzoates or potassium sorbate.

The binder is preferably pectin, guar gum, fruit pectin, citrus pectin, tobacco pectin, hydroxyethyl guar gum, hydroxypropyl guar gum, hydroxyethyl locust bean gum, hydroxypropyl locust bean gum, alginate, starch, modified starch, derivatized starch, methyl cellulose, ethyl cellulose, ethylhydroxymethyl cellulose, carboxymethyl cellulose, tamarind gum, dextran, pullalon, konjac flour or xanthan gum.

Preferably, the tobacco dust comprises tobacco particles having an average particle size of at least about 120 micrometres. In addition, or as an alternative, the tobacco dust comprises tobacco particles having an average particle size of less than about 180 micrometres. This corresponds to the size of tobacco dust particles typically formed in the processing of tobacco for the manufacture of cigarettes and other tobacco products based on cut tobacco leaves and stems. Further, this tobacco particle size is beneficial due to its impact on the viscosity of the slurry, such that the total solids content of the slurry may be increased without substantially altering the desired viscosity of the slurry. In addition, by choosing a smaller tobacco particle size, less binder may be required. The use of less binder results in a greater amount of tobacco in the tobacco objects obtainable by method according to the present invention. This is advantageous in that aromatic and flavour characteristics closer to those of whole leaf tobacco may be preserved in the tobacco objects.

Preferably, the slurry has a total solids content other than water of at least about 15 percent, preferably 20 percent. More preferably, the slurry has a total solids content of at least about 25 percent. In addition, or as an alternative, the slurry preferably has a total solids content of less than about 40 percent. More preferably, the slurry has a total solids content of less than about 30 percent. Within this preferred range, about 20 to 80 percent, preferably 40 to 60 percent of the total solids are preferably tobacco. The slurry may be formed in a batch method or in a continuous method.

In methods according to the invention, the aqueous slurry containing the tobacco dust is supplied to a print head of an additive manufacturing system and dispensed by means of the print head to form successive layers of a tobacco object. By way of example, the slurry is supplied to the printing head of a 3D printer and dispensed through a nozzle to form successive layers of the tobacco object.

A wide variety of three-dimensional shapes can be obtained by the method of the invention, including rectangular, trapezoidal, sinusoidal, ring shaped, Y-shaped, X-shaped and V-shaped.

Preferably, the slurry is dispensed by means of the print head through a nozzle aperture having a diameter of at least about 140 micrometres. This is advantageous in that with this type of nozzle aperture tobacco particles having an average size as defined above can easily pass through without causing obstructions. In addition, or as an alternative, the slurry is preferably dispensed by means of the print head through a nozzle aperture having a diameter of less than about 220 micrometres. This is so a coherent three-dimensional object may be formed.

Preferably, the step of dispensing the slurry to form layers of the tobacco object comprising moving the print head by a step-to-step increment of at least about 140 micrometres. In addition, or as an alternative, the step of dispensing the slurry to form layers of the tobacco object comprising moving the print head by a step-to-step increment of less than about 220 micrometres.

Preferably, the method further comprises heating the printing head to a temperature of at least about 80 degrees Celsius. More preferably, the method heating the printing head to a temperature of at least about 140 degrees Celsius. This is advantageous because it has been found that, at these temperatures, the reduced sugars contained in the tobacco material are activated to act as binders. Thus, it is not necessary to supply additives prior to carrying out the additive manufacturing steps, which makes the process particularly easy and cost-effective. Further, because no non-tobacco additives are used, the natural flavour notes of the tobacco material are not impacted or altered in any way.

In some embodiments, the aqueous slurry contains a first type of tobacco dust and the method further comprises preparing a further aqueous slurry containing a second type of tobacco dust and supplying the further slurry to the printing head, so that, in the step of dispensing the slurry, the first and the second tobacco types are mixed. This is advantageous because the properties of the finished product can be more easily and finely tailored. In particular, due to the three-dimensional structure of the tobacco object obtainable by the method, a filler material with an increased filling power can be formed while maintaining the overall performance in terms of burning rate and smoke delivery profiles. In practice, by adjusting the proportion of first and second types of tobacco dust it is possible to adjust flavour notes and smoke delivery of the tobacco object and, consequently, of the filler material containing the three-dimensional tobacco object.

Preferably, the method further comprises curing the formed layers of the tobacco object. Suitable heat sources for the curing include hot air, infrared, laser and plasma jet.

In some embodiments, the tobacco object obtained from the method is a tobacco filler particle for use in smoking articles. Tobacco filler particles obtained by a method in accordance with the present invention may be incorporated into a variety of smoking articles. In some embodiments, tobacco filler particles obtained by methods according to the invention may be used in the tobacco rod of a combustible smoking article, such as a filter cigarette, cigarillo or cigar. Alternatively, the tobacco filler particles may be used to provide the tobacco aerosol generating substrate in a distillation based smoking article, or an electrically heated smoking system. Alternatively, the tobacco filler particles may be used as a roll-your-own or make-your-own product, or loose tobacco product for use in a pipe.

The invention will be further described, by way of example only, with reference to the drawings of the accompanying FIG. 1, which illustrates a schematic perspective view of a tobacco object obtained by a method according to the present invention.

EXAMPLE 1

A slurry was prepared by admixing fine tobacco particles with an average particle size of about 140 micrometres with water, glycerin and pectin. The total solids content of the slurry was about 22 percent (78 percent of the slurry consisted of water). Of these solids, about 41 percent were tobacco particles.

The slurry was supplied to the printing head of a 3D printer, the printing head having a nozzle aperture of about 160 micrometres. The printing head was heated to a temperature of about 110 degrees Celsius. The slurry was dispensed from the printing head to form successive layers of three-dimensional filler particles for use in smoking articles.

One such three-dimensional filler particle 10 is shown in FIG. 1. The filler particle 10 has a substantially cylindrical tubular structure. In order to form the filler particle 10, the slurry was dispensed in successive layers, the slurry being deposited in each layer in a substantially annular shape. The formed layers of the tobacco object were finally cured by hot air.

The invention claimed is:

1. A method of making a three-dimensional tobacco object, comprising:

providing tobacco dust comprising tobacco particles having an average particle size of from about 100 micrometres to about 400 micrometres;

preparing an aqueous slurry containing the tobacco dust;

supplying the slurry to a print head of an additive manufacturing system, wherein the print head is heated to a temperature of at least about 80 degrees Celsius; and dispensing the slurry with the print head to form successive layers of the tobacco object.

2. A method according to claim 1, wherein the tobacco dust comprises tobacco particles having an average particle size of at least about 120 micrometres.

3. A method according to claim 1, wherein the tobacco dust comprises tobacco particles having an average particle size of less than about 180 micrometres.

4. A method according to claim 1, wherein the slurry has a total solids content of at least about 15 percent.

5. A method according to claim 4, wherein at least 40 percent of the total solids content of the slurry is tobacco.

6. A method according to claim 1, wherein the slurry is dispensed by means of the print head through a nozzle aperture having a diameter of at least about 140 micrometres.

7. A method according to claim 1, wherein the slurry is dispensed by means of the print head through a nozzle aperture having a diameter of less than about 220 micrometres.

8. A method according to claim 1, wherein the step of dispensing the slurry to form layers of the tobacco object comprising moving the print head by a step-to-step increment of at least about 140 micrometres.

9. A method according to claim 1, wherein the step of dispensing the slurry to form layers of the tobacco object comprising moving the print head by a step-to-step increment of less than about 220 micrometres.

10. A method according to claim 1, further comprising heating the printing head to a temperature of at least about 140 degrees Celsius.

11. A method according to claim 1, wherein the aqueous slurry contains a first type of tobacco dust; the method further comprising preparing a further aqueous slurry containing a second type of tobacco dust and supplying the further slurry to the printing head, so that, in the step of dispensing the slurry, the first and the second tobacco types are mixed.

12. A method according to claim 1, further comprising curing the formed layers of the tobacco object.

13. A method according to claim 1, wherein the tobacco object is a tobacco filler for use in smoking articles.

* * * * *